Patented May 8, 1923.

1,454,351

UNITED STATES PATENT OFFICE.

HENRY THOMAS, OF CLEVELAND, OHIO.

METHOD OF AND FLUX FOR REFINING BRASS.

No Drawing.      Application filed October 28, 1920. Serial No. 420,227.

*To all whom it may concern:*

Be it known that I, HENRY THOMAS, a citizen of the United States, and a resident of Cleveland, county of Cuyahoga, and State of Ohio, have invented a new and useful Improvement in Methods of and Flux for Refining Brass, of which the following is a specification, the principle of the invention being herein explained and the best mode in which I have contemplated applying that principle, so as to distinguish it from other inventions.

The present invention relates to an improved method of refining brass, and more particularly to a method of purifying or refining scrap brass and copper. While in use, brass and copper are quickly and extensively contaminated from various causes, such as corrosion, the intermixture of dirt with the material when in a finely divided condition, etc., and it is to the purification of this scrap material that the present invention is directed. To the accomplishment of the foregoing and related ends, said invention, then, consists of the means hereinafter fully described and particularly pointed out in the claims.

The following description sets forth in detail one method and one product exemplifying my invention, such disclosed procedure and product constituting however, but one of various applications of the principles of my invention.

My improved flux consists of a mixture of fluorspar, glass and borax. In the refining of brass and copper by the use of this flux, the flux should be charged first into the furnace or melting pot and should initially be at the bottom of the mass of metal which is to be purified in order that the ingredients of the flux may work upwardly through the molten mass of metal and come in contact, so far as possible, with the entire body of metal that is to be refined.

The proportions in which I find the flux acts with the greatest success are two parts of finely ground glass to one part of borax and one part of fluorspar. The action of the fluorspar is to hold the several elements together and to protect the furnace itself, while the glass and borax in these proportions have been found to very successfully remove the impurities from the metal, carrying these impurities to the surface of the molten metal in a sort of slag, which is then skimmed off, after which the metal can be cast into any desired form. It is usually sufficient to use from nine to ten ounces of the flux to each hundred pounds of metal, although the exact amount of flux to be used should be roughly gauged in respect to the amount of impurities in the scrap metal.

When brass alloys are heated, it is essential to protect the alloy by using flux which will take out the impurities and at the same time form a slag which will cover the metal in such a manner as to form a covering which will maintain its covering effect through a wide range of temperature. While borax or fluorspar alone will remove the impurities they do not form a slag which maintains itself over the alloy through a wide range of temperature; but when these two elements are combined with glass, a pasty sticky slag is formed which covers the metal thoroughly throughout a very wide range of temperature so that the resultant alloys come out uniform even if the temperatures employed vary considerably.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of refining brass scrap, the steps which consist in fusing such scrap with a flux consisting of two parts of glass, one part of borax and one part of fluorspar.

2. A flux for refining scrap brass, consisting of two parts of glass, one part of borax and one part of fluorspar.

Signed by me, this 23 day of October, 1920.

HENRY THOMAS.